United States Patent
Ramsey et al.

(10) Patent No.: US 7,739,833 B2
(45) Date of Patent: Jun. 22, 2010

(54) FOAMED VITROEOUS MATERIALS FOR AGRICULTURAL APPLICATIONS

(76) Inventors: W. Gene Ramsey, 5498 Saddle Ridge Ct., Las Cruces, NM (US) 88011; Andrew Ungerleider, 525 Camino Militar, Santa Fe, NM (US) 87501

( * ) Notice: Subject to any disclaimer, the term of this patent is extended or adjusted under 35 U.S.C. 154(b) by 1079 days.

(21) Appl. No.: 11/276,027

(22) Filed: Feb. 10, 2006

(65) Prior Publication Data
US 2007/0186467 A1 Aug. 16, 2007

(51) Int. Cl.
*A01G 31/00* (2006.01)
(52) U.S. Cl. .......................................... 47/64
(58) Field of Classification Search ............. 47/1.01 R, 47/59 R, 64, 59 S, 63, 66.7, 80, 58.1 R, 58.1 SC; 65/17.4
See application file for complete search history.

(56) References Cited

U.S. PATENT DOCUMENTS

| | | | |
|---|---|---|---|
| 2,514,324 A | 7/1950 | Ford | |
| 2,620,597 A | 12/1952 | Ford | |
| 2,955,049 A | 10/1960 | Booth | |
| 2,971,292 A | 2/1961 | Malecki | |
| 3,056,184 A | 10/1962 | Blaha | |
| 3,151,966 A * | 10/1964 | Slayter | 65/22 |
| 3,348,933 A | 10/1967 | Schulz | |
| 3,432,580 A | 3/1969 | Heidrich et al. | |
| 3,443,920 A | 5/1969 | Overcashier et al. | |
| 3,527,587 A | 9/1970 | Velev et al. | |
| 3,532,480 A | 10/1970 | D'Eustachio | |
| 3,574,583 A | 4/1971 | Goldsmith | |
| 3,585,014 A | 6/1971 | Malesak | |
| 3,607,170 A | 9/1971 | Malesak | |
| 3,870,496 A | 3/1975 | Cutler | |
| 3,874,861 A | 4/1975 | Kurz | |
| 3,963,503 A | 6/1976 | Mackenzie | |
| 3,972,667 A | 8/1976 | Hanusa | |
| 4,023,308 A | 5/1977 | Staby | |
| 4,038,063 A | 7/1977 | Williams et al. | |
| 4,038,779 A | 8/1977 | Roberts, Jr. et al. | |
| 4,043,719 A | 8/1977 | Jones | |
| 4,050,873 A | 9/1977 | Brunlik et al. | |
| 4,105,432 A | 8/1978 | Gaertner | |
| 4,124,365 A | 11/1978 | Williams et al. | |
| 4,190,416 A | 2/1980 | North | |
| 4,212,635 A | 7/1980 | North | |
| 4,274,825 A | 6/1981 | North | |
| 4,289,521 A | 9/1981 | Schymura | |
| 4,347,326 A * | 8/1982 | Iwami et al. | 501/39 |

(Continued)

FOREIGN PATENT DOCUMENTS

DE 4107941 9/1992

(Continued)

Primary Examiner—Francis T Palo
(74) Attorney, Agent, or Firm—C. John Brannon; Brannon & Sowers PC

(57) ABSTRACT

A foamed glass plant growth support structure, including a foamed glass substrate and a plurality of interconnected pores distributed throughout the substrate. The substrate is characterized by a porosity of at least about 80 percent. The pore size is substantially between about 0.2 and about 5 millimeters and the substrate is sufficiently chemically stable such that water filling the plurality of interconnected pores experiences a pH shift of less than 0.5.

16 Claims, 4 Drawing Sheets

U.S. PATENT DOCUMENTS

| | | | |
|---|---|---|---|
| 4,826,788 A | 5/1989 | Dennert et al. | |
| 4,879,172 A | 11/1989 | Meunier | |
| 4,933,306 A | 6/1990 | Pietsch | |
| 4,981,820 A | 1/1991 | Renlund et al. | |
| 4,992,321 A | 2/1991 | Kandachi et al. | |
| 5,010,042 A * | 4/1991 | Kandachi | 501/32 |
| 5,039,630 A | 8/1991 | Itami et al. | |
| 5,099,609 A | 3/1992 | Yamauchi | |
| 5,326,382 A | 7/1994 | Oat | |
| 5,516,351 A * | 5/1996 | Solomon et al. | 65/17.4 |
| 5,578,121 A | 11/1996 | Eder et al. | |
| 5,675,929 A | 10/1997 | Sontea et al. | |
| 5,776,224 A | 7/1998 | Trautmann et al. | |
| 5,791,085 A | 8/1998 | Szmidt et al. | |
| 5,821,184 A | 10/1998 | Haines et al. | |
| 5,900,387 A | 5/1999 | Rines | |
| 5,972,817 A | 10/1999 | Haines et al. | |
| 5,983,671 A * | 11/1999 | Haines et al. | 65/22 |
| 6,240,674 B1 | 6/2001 | Otake et al. | |
| 6,263,615 B1 | 7/2001 | Hirose | |
| 6,887,828 B2 | 5/2005 | Allen et al. | |
| 7,069,691 B2 | 7/2006 | Brooke et al. | |
| 2003/0051398 A1 | 3/2003 | Kosinski | |
| 2004/0249505 A1 | 12/2004 | Sardas | |
| 2005/0115469 A1 | 6/2005 | Yu | |
| 2005/0186254 A1 | 8/2005 | Roser et al. | |
| 2006/0150495 A1 | 7/2006 | MacConnell | |
| 2006/0150496 A1 | 7/2006 | Blaakmeer et al. | |
| 2007/0149078 A1 | 6/2007 | Nandi et al. | |
| 2007/0186467 A1 * | 8/2007 | Ramsey et al. | 47/59 S |
| 2008/0034653 A1 | 2/2008 | Ramsey et al. | |

FOREIGN PATENT DOCUMENTS

| | | | |
|---|---|---|---|
| JP | 2002305959 | | 10/2002 |
| JP | 2003055064 | * | 2/2003 |
| JP | 2003147873 | | 5/2003 |
| JP | 2003180154 | | 7/2003 |
| JP | 2004298050 | | 10/2004 |
| WO | 9610542 | | 4/1996 |
| WO | 9736835 | | 10/1997 |

* cited by examiner

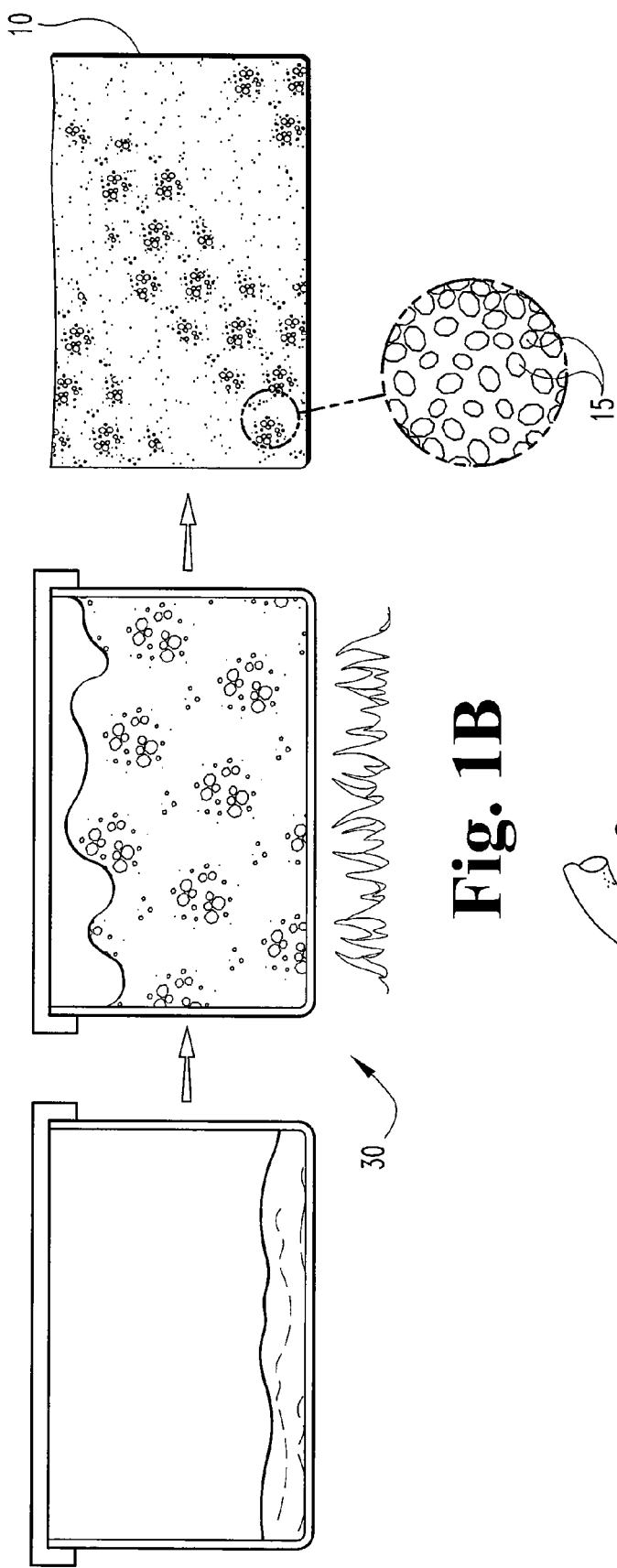
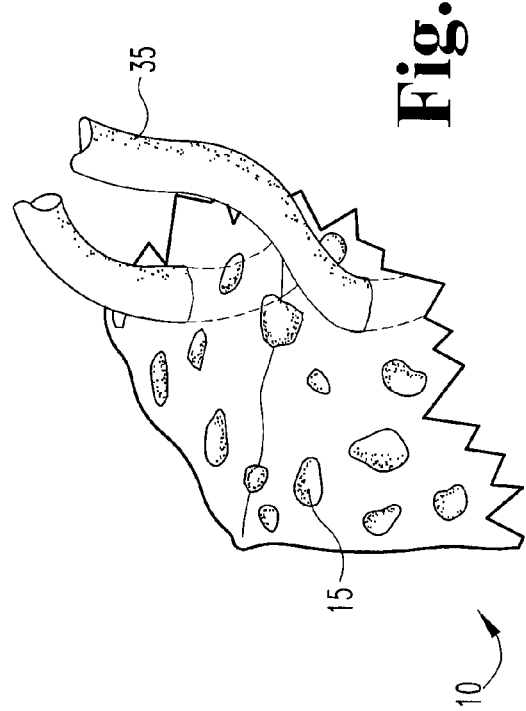

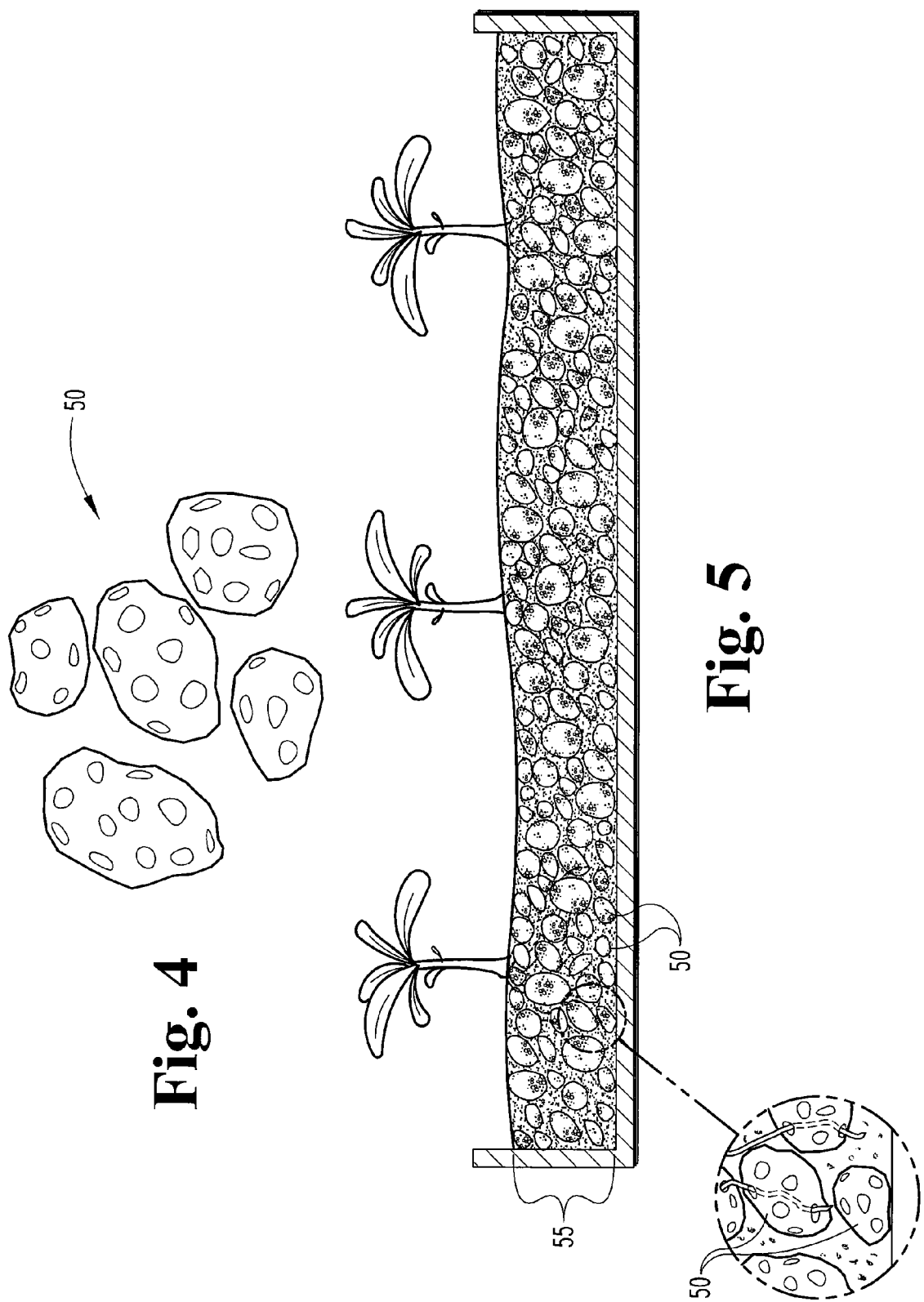

FOAMED VITREOUS MATERIALS FOR AGRICULTURAL APPLICATIONS

TECHNICAL FIELD OF THE INVENTION

The invention relates generally to the field of ceramic materials and, specifically, to a foamed vitreous material having porosity for water storage and root propagation.

BACKGROUND OF THE INVENTION

Hydroponics is the science of growing plants in a nutrient solution with the mechanical support of an inert medium. Hydroponics is an old art, and a variety of inert media are known as suitable for the germination, rooting and growth of plants. Such substrates include peat, vermiculite, perlite, fly ash, pumice, rock wool, glass wool, organic and inorganic fibers, polymers such as polyurethane, polystyrene, polyethylene, and the like. These substrates have been used for true hydroponics or in quasi-hydroponic environments such as in admixtures with soil. Typically, the inert medium is either in the form of a contained loose particulate, such as sand, or as a rigid and self-supporting structure that can support growth of the plant. The rigid structure has some notable advantages over the loose particulates, in particular the ability to stand alone without a requisite container. However, the loose particulate media tend to offer better pathways for water and gasses to be delivered to and from the root systems.

One problem common to hydroponic gardening is overwatering. Hydroponic techniques lend themselves to the provision of excessive water to the plant root system, which may result in chlorosis, retarded growth, pallor, and, eventually death. In such situations, the water around the roots becomes stagnant and gasses dissolved therein are only urged to and from the roots through diffusion. Moreover, vital gasses quickly become depleted and waste gasses saturated in the water proximate the roots, exacerbating the situation. Thus, it is desired to reduce the stagnant water around the roots by circulating the water.

Most of the substrates currently known are solids with limited porosity. Some known substrates have attempted to add or increase the porosity of the substrate in order to better provide for gas exchange to the roots. One such substrate has been produced in the form of a sponge-like or foraminous foamed polymer body with conduits 1-5 millimeter in nominal diameter, spaced about 1-8 mm apart and extending throughout the substrate. The conduits drain water from the substrate and provide reservoirs of oxygen for the plant roots and at the same time allow substrate to hold some water that may then be available to the roots. The porosity of this substrate ranges from between 6 and 53 percent. Soil or the like is deposited on top of the substrate and a seed, cutting or small plant is placed in the soil. With the substrate under the soil layer, over-watering induced problems are prevented, as excess water drains from the substrate, filling the conduits with air and oxygen will be readily available to the roots.

Similarly to hydroponic agriculture, soil amendment is a common practice for growing plants in places where adequate amounts of fertile soil are unavailable. In soil amendment, media similar to those discussed above are added to soils (especially in greenhouse applications) to improve water retention and aeration around the root bed. Water is used as a means to deliver nutrition and oxygen—soil amendments that increase the effective soil porosity and water retention potential are vital for plant life and growth rate.

While useful in hydroponic and soil amendment applications, the above substrates are still hampered by a lower than optimal porosity and low capacity for water infiltration and retention. Thus, there remains a need for a highly porous substrate for supporting plant growth. There also remains a need for improves the aeration of soil and allows for better water filtration and irrigation. The present invention addresses these needs.

SUMMARY OF THE INVENTION

The present invention relates to a foamed glass material for supporting plant growth, and the method for making the same. One object of the present invention is to provide an improved foamed glass plant support substrate material. Related objects and advantages of the present invention will be apparent from the following description.

BRIEF DESCRIPTION OF THE DRAWINGS

FIG. 1B is a schematic view of a process for firing a foamed glass article mixed according to FIG. 1A.

FIG. 2 is a partial perspective view of roots infiltrating the porosity of the foamed glass article of FIG. 1B.

FIG. 4 is a plan view of a plurality of crushed foamed glass pebbles according to a second embodiment of the present invention.

FIG. 5 is a cutaway elevation view of the article of FIG. 2 as partially immersed in soil and water and supporting plant growth.

DETAILED DESCRIPTION OF THE PREFERRED EMBODIMENTS

Figure 1A:
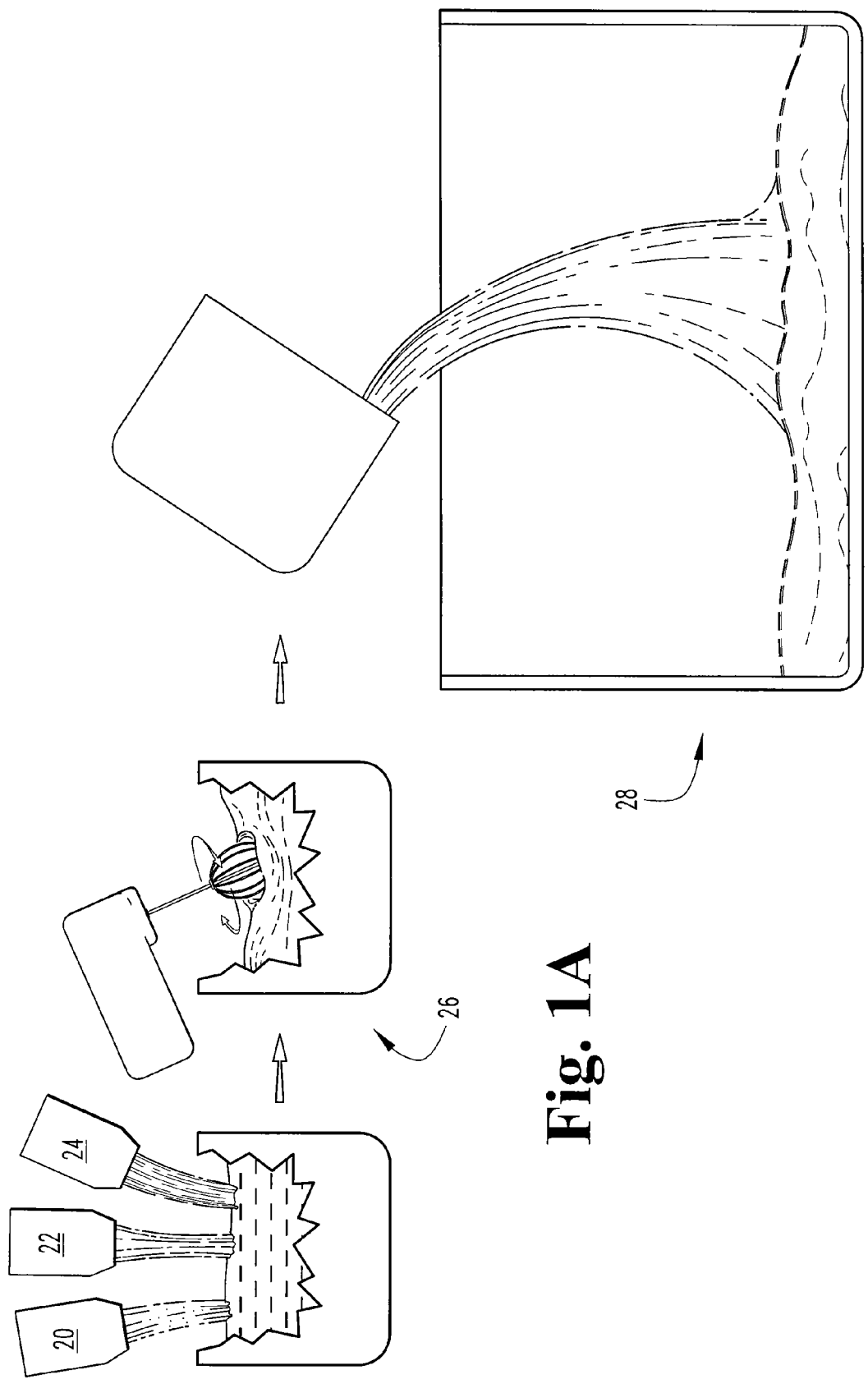
FIG. 1A is a schematic view of a process for mixing a batch of precursors for a foamed glass article according to a first embodiment of the present invention.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

FIG. 1A-4 illustrate a first embodiment of the present novel technology, a lightweight foamed glass substrate 10 characterized by voluminous, interconnecting pores 15 for supporting plant growth. As illustrated schematically in FIGS. 1A-B, a powdered glass precursor 20, such as recycled waste glass, is mixed with a foaming agent 22 (typically a finely ground non-sulfur based foaming agent, such as calcium carbonate). The foaming agent is typically sized in the average range of about 80 to minus 325 mesh (i.e. any particles smaller than this will pass through—typically, the apertures in 80 mesh are between about 150 and about 200 micrometers across and the apertures in −352 mesh are between about 40 and about 60 micrometers across). More typically, the foaming agent has a particle size between about 5 and about 150 microns. Additional plant growth nutrient material 24 is also typically added to the starting mixture to vary or enhance the plant growth characteristic of the final product 10. Further, foamed glass, like most ceramics, is naturally hydrophobic. As hydrophobic surfaces are not conducive to wetting and impede capillary action, an agent is typically added to amend the surface properties to make the foamed glass more hydrophilic. Such an agent may be a large divalent cation contributor, such as ZnO, BaO, SrO or the like. The hydrophilic agent is typically added in small amounts, typically less than 1.5 weight percent and more typically in amounts of about 0.1 weight percent.

The combination is mixed 26, and the resulting dry mixture is then placed into a mold 28. Typically, the mixture is placed into the mold 28 in the form of several rows of the mixture, such as in mounds or piles of mixture typically having a natural angle of repose of about 15 to 50 degrees, although even greater angles to the horizontal can be achieved by compressing the dry mixture. The mold 28 is typically a refractory material, such as a steel or ceramic, and is more typically made in the shape of a frustum so as to facilitate easy release of the final foamed glass substrate 10. Typically, the inside surfaces of the mold 28 are coated with a soft refractory release agent to further facilitate separation of the foam glass substrate from the mold 28.

The so-loaded mold 28 is placed into a furnace for either a batch or continuous foaming process, and the mixture is then heated 30 in order to sinter, fuse, soften and foam the mixture and thereby produce a foamed glass substrate 10 having a desired density, pore size and hardness. As the powdered mixture is heated to above the softening point of glass (approximately 1050 degrees Fahrenheit) the mixture begins to soften, sinter, and shrink. The division of the powdered mixture into rows or mounds allows the glass to absorb heat more rapidly and to therefore foam faster by reducing the ability of the foaming glass to insulate itself. At approximately 1058 degrees Fahrenheit, the calcium carbonate, if calcium carbonate has been used as the foaming agent, begins to react with some of the silicon dioxide in the glass to produce calcium silicate and carbon dioxide. Carbon dioxide is also formed by any remaining calcium carbonate once the mixture reaches 1274 degrees Fahrenheit, above which calcium carbonate breaks down into calcium oxide and carbon dioxide gas. The release of carbon dioxide and its expansion and escape through the softened, viscous glass is primarily responsible for the formation of cells and pores in the softened glass mass. The mixture in the mold 28 is held for a period of time at a peak foaming temperature of, for example, between about 1275 and about 1700 degrees Fahrenheit, or even higher, depending on the properties that are desired. By adjusting the firing temperatures and times, the density and hardness as well as other properties of the resultant substrate 10 may be closely controlled.

As the furnace reaches foaming temperatures, each mass of foaming glass, originating from one of the discrete rows or mounds, foams until it comes into contact and fuses with its neighbors. The fused mass of foaming glass then expands to conform to the shape of the walls of the mold, filling all of the corners. The shapes and sizes of the initial mounds of mixture are determined with the anticipation that the foaming mixture exactly fill the mold. After the glass is foamed to the desired density and pore structure, the temperature of the furnace is rapidly reduced to halt foaming of the glass. When the exterior of the foamed glass in the mold has rigidified sufficiently, the resultant body 10 of foamed glass is removed from the mold 28 and is typically then placed into a lehr for annealing. The temperature of the lehr is typically slowly lowered from the softening temperature of the glass to ambient temperature to anneal the porous block of foamed glass 10. Once cooled, any skin or crust is typically cut off of the foamed glass substrate 10, which may then be cut or otherwise formed into a variety of desired shapes. Pore size can be carefully controlled within the range of about 5 mm to about 0.5 mm.

Substrate density can be controlled from about 0.4 g/cc to about 0.15 g/cc. Typically, the bulk density of the crushed foam may be as low as 50% of the polyhedral density.

The substrate 10 is typically either formed as either crushed pebbles 50 (typically sized to be less than 1 inch in diameter) or machined polyhedral shape (see FIG. 4). The crushed substrate material 50 may be used to retain water and increase air volume in given soil combinations. The polyhedrally shaped substrate bodies 10 are typically sized and shaped as growing media for seeds and immature plants, such as for use in soil or hydroponic systems 40 (see FIGS. 3 and 5). The foamed glass substrate material 10 is thus used to improve aeration and water retention in agricultural systems, and the porous polyhedral material 10 also provides a sufficiently spacious path for root growth and attenuation. The foamed material 10 is typically resistant to aqueous corrosion and has minimal impact on solution pH. Typically, the foamed material 10 is doped (in batch stage, prior to foaming) with specific nutritional species 24 (such as, but not limited to including P, Mg, Ca, K, and transition metals) as may be desired by the grower. The foamed glass substrate 10 can typically hold between about 1.5 and about 5 times its own weight in water in the plurality of interconnected pores. The foamed glass substrate 10 is typically chemically stable as formed, but may be given a pretreatment wash to further increase its chemical stability.

Crushed foam bodies may be rapidly made by an alternate method. Using soda-lime glass frit or powder as the glass component 22, the processing is similar to that described above but without the annealing step. The alternate method employs the same foaming temperature ranges as related above. The batch material consists of up to 8 percent by mass limestone, magnesite, or other applicable foaming agent 22, usually less than 2 percent by mass nutrients 24 (added as oxides, carbonates, nitrates, or other suitable forms), with the balance being a borosilicate, silicate, borate or phosphate glass frit 22. The batch is then placed in a typically shallow mold 28, more typically having a configuration of less than 2" batch for every square yard of mold surface. The mold 28 is typically then heated to approximately 250° C. above the dilatometric softening point for soda-lime glass (or the equivalent viscosity for other glass compositions) and allowed to foam. The mold 28 is held at the foaming temperature for less than 30 minutes and then pan quenched, i.e. substantially no annealing is allowed to occur This method yields a material 10 of density typically less than 0.15 g/cc, and more typically as low as about 0.03 g/cc. This material 10 is then crushed into pebbles, with a corresponding lower bulk density as per the above-described method. Material made by this alternate method has similar chemical properties as described above, can accommodate an even larger nutrient content, but has substantially lower strength.

Still another alternate method of preparing foamed glass substrate material 10 is as follows. A batch is prepared as discussed above and pressed into small (typically less than 5 mm diameter) pellets. The pellets are rapidly heated, such as by passage through a flame source, passage through a rotary furnace, or the like. Typically, the pellets are heated to about 1500 degrees Fahrenheit, such as to cause the pellet to expand as a foam particulate without the need for a mold. This material yields the weakest, but least dense foam particles. The typical density may be as low as 0.02 g/cc or as high as 0.2 g/cc.

The foamed glass substrate 10, either in polyhedral body form or crushed product form, may serve as a root system support and an aeration and/or water retention aid. The material 10 typically enjoys a void fraction of at least about 80 percent. The substrate 10 is typically mechanically mixed with as little as 15% by volume soil or soil mixture and this new mixture will still generate solution chemistry dominated by soil.

The polyhedral product 10 typically functions as a supporting substrate for both soil based and hydroponic applications. The polyhedral substrate 10 may be tailored to be compatible with mildly acidic, neutral, or mildly alkaline solution pH. The pore network 15 is compatible with root propagation through the material 10.

EXAMPLE 1

A plant growth support substrate 10 having a pore network 15 and plant nutrients embedded therein is produced from a precursor batch of about 3 weight percent calcium carbonate sized at minus 200 mesh, about 2 weight percent high-potassium nutrient, about 0.1 weight percent ZnO hydrophilic agent, and about 95 weight percent recycled plate glass ground to minus 140 mesh, 60 to 100 mesh, are mixed together. The resulting mixture is placed into a stainless steel mold having inside dimensions of 4.25 inches by 4 inches by 8.25 inches. The mold is covered with a ½ inch stainless steel plate. The mold with the mixture therein is then fired to 1250 degrees Fahrenheit for 60 minutes. The temperature is next ramped to 1450 degrees Fahrenheit for 30 minutes, where foaming takes place. The foamed glass in the mold is annealed by cooling slowly to room temperature over 120 minutes. The cooled block of foamed glass is removed from the mold, and the outer layer of crust is removed (such as with a band saw) to expose the open porosity. The resulting block typically has a density of about 14 pounds per cubic foot and a pore size distribution ranging from about 0.5 to 2 mm. The resulting block has final dimensions of 4 inches by 3.75 inches by 8 inches. The resulting block has open, interconnected cells.

EXAMPLE 2

Plant growth media is formed by preparing a mixture of about 3 weight percent calcium carbonate foaming agent sized at minus 200 mesh, about 3 weight percent high phosphorous nutrient powder, about 0.1 weight percent BaO hydrophilic agent, with the balance being recycled container glass sized at minus 325 mesh. The mixture is then was positioned in a mold and heated to a foaming temperature of 1400 degrees Fahrenheit for 45 minutes followed by a rapid quench to room temperature. The resulting foamed glass article is then crushed to produce foamed glass media with an open porosity of between about 80 and 90 percent with pores ranging from between about 1 and about 3 mm in diameter.

EXAMPLE 3

To prepare a block for cleaning tile, porcelain or enameled surfaces, a procedure similar to that of Example 1 was used by mixing together about 1.5 weight percent magnesite foaming agent (minus 200 mesh), about 3 weight percent oxide nutrient, about 0.1 weight percent SrO hydrophilic agent, with the balance being recycled container glass (minus 325 mesh). The mixture is placed in a mold and heated to a foaming temperature of about 1360 degrees Fahrenheit for 60 minutes. The resultant foamed glass body is then allowed to anneal and then cool, to yield a foamed glass article with a porosity of about 85 percent and a pore size distribution ranging from about 0.05 to 0.2 mm. The article may be machined to shape or crushed to form pebbles.

EXAMPLE 4

A foamed glass article may be prepared by mixing together about 0.1 weight percent calcium carbonate foaming agent, about 0.1 weight percent ZnO hydrophilic agent, about 2 weight percent oxide nutrient, and the balance recycled container glass, with all powders being sized at minus 325 mesh. The mixture is placed in a mold and heated to a foaming temperature of about 1425 degrees Fahrenheit for about 25 minutes. The resulting foamed glass article is typically annealed. The resulting article will have a porosity of about 90 to about 95 percent, with a pore size distribution ranging from about 0.01 to 0.1 mm. The resulting block can be machined into a desired shape, cut into smaller blocks, or crushed into pebbles.

EXAMPLE 5

Crushed glass pebbles are prepared by mixing together about 2.5 weight percent calcium carbonate foaming agent sized at minus 200 mesh, about 3 weigh percent phosphorous and potassium oxides, about 0.1 weight percent ZnO, about 20 weight percent sand sized at between 60 and 100 mesh, with the remainder being powdered soda-lime-silica glass. The mixture is loaded into a mold and fired to about 1500 degrees Fahrenheit for foaming for about 20 minutes, followed by a rapid quench. The resulting article has a porosity of between about 70 and about 80 percent with a pore size distribution ranging from about 1 to 3 mm. The resulting article is crushed to produce pebbles between about 1 and about 2 centimeters in diameter.

EXAMPLE 6

A porous crushed glass substrate is produced by mixing together between about 5 and about 10% weight percent calcium carbonate sized at minus 200 mesh, about 0.1 weight percent ZnO, about 3 weight percent $K_2O$, with the balance being crushed recycled container glass ground to minus 325 mesh. The mixture is loaded into a mold and heated to a 1600 degree Fahrenheit foaming temperature for 15 minutes. The resultant foamed glass article is annealed and cooled and has a porosity of between about 90 and about 95 percent and a pore size distribution ranging from about 2 to 4 mm. The resulting article may be cut or machined into a desired shape or may be crushed into pebbles. Alternately, the annealing step may be replaced by a rapid quench and the block crushed into pebbles.

EXAMPLE 7

A foamed glass block may be produced by mixing together about 3 weight percent minus 200 mesh calcium carbonate, about 3 weight percent $P_2O_3$, about 0.1 weight percent ZnO with the balance minus 60 mesh recycled container glass. The mixture is loaded into a mold and heated to a foaming temperature of 1500 degrees Fahrenheit for 40 minutes. The resulting article has a density of about 85 percent and a pore size distribution ranging from about 2 to 4 mm.

EXAMPLE 8

Glass pebbles are prepared by mixing together about 1 percent calcium carbonate foaming agent sized about 10-20 micron median particle size, about 1 percent ZnO, about 0.2 percent calcium borate, with the remainder powdered soda-lime glass. The mixture is pressed into 2 mm diameter pellets and fired without a mold to about 1500 degrees Fahrenheit for foaming with a residence time of about 20 minutes, followed by a rapid air quench. The resulting articles have a porosity of between about 80 and 95 percent with a pore size ranging between 0.1 and 2.5 mm. The resulting articles can be crushed to 3× pore size as needed.

EXAMPLE 9

This Example provides some additional detail concerning the expedient mounding of the foamable mixture. A block of foamed glass material suitable for use as a plant growth support substrate is produced by thoroughly mixing together (such as for 20 minutes in a mechanical mixer) about 2.5 weight percent calcium carbonate powder (100% of which passes through a 200 mesh screen), about 20 weight percent common sand (100% of which passes through a 40 mesh screen but which does not pass through an 80 mesh screen), about 0.1 weight percent ZnO (100% of which passes through a 200 mesh screen), about 3 weight percent $K_2O$ (100% of which passes through a 200 mesh screen) with the balance being ground recycled container glass (100% of which passes through a 325 mesh screen).

A ¼ inch stainless steel plate having a dimension of 20 inches.times.26 inches is coated with a thin slurry of talc and alumina as agents to prevent sticking. A stainless steel mold is coated with the same slurry. The mold has the shape of a frustum and was open at the base. The base dimensions are 20 inches by 26 inches, and the peak dimensions are 19 inches by 26 inches; the mold is 6 inches deep. The four portions of 3 kg are divided from the batch, and each portion is placed on the 20 inch by 26 inch plate in a row such that it has base dimensions of 4.5 inches by 16 inches. The four rows are typically evenly spaced 2 inches apart. The rows, which typically are oriented parallel to the long dimension of the plate, are spaced 1 inch away from the edge of the plate. The ends of the rows are placed 2 inches away from the short edges of the plate. Each row typically has a trapezoidal cross-section the base of which, such as 4.5 inches and the top of which is 3.5 inches, with a height of 3 inches. Each portion may be compacted into the above shape, and the bulk density of the powder after being compacted is about 72 pounds per cubic foot. A frustum shaped lid is lowered onto the plate supporting the mounds of foamable mixture, whereupon the entire assembly is placed into a furnace.

The furnace is rapidly heated to about 1250 degrees Fahrenheit and is held for a one-hour soak to allow the foamable mixture to sinter and absorb heat evenly. The temperature is then rapidly increased to 1500 degrees Fahrenheit and held there for a one-hour soak. The mounds of powder then foam, fuse, and fill the mold. The temperature may then be rapidly lowered to about 1050 degrees Fahrenheit and held there for at least about 15 minutes to halt the foaming process and to solidify the outside skin of the mass of foamed glass. The frustum shaped portion of the mold may then be removed from the mass of solidified foamed glass. The block of foamed glass article may then be placed in an annealing lehr to slowly cool the foamed glass article to ambient temperature, or alternately, the foamed glass article may be rapidly quenched to room temperature. The finished and cooled annealed block of foamed glass may then be planed and trimmed to remove the glassy skin and traces of release agent, and the finished cut block of foamed glass may be cut or machined into any desired shape. The foamed glass article will have a porosity of about 90 percent and a pore size distribution ranging from about 2.0 to 5.0 mm.

Figure 3:
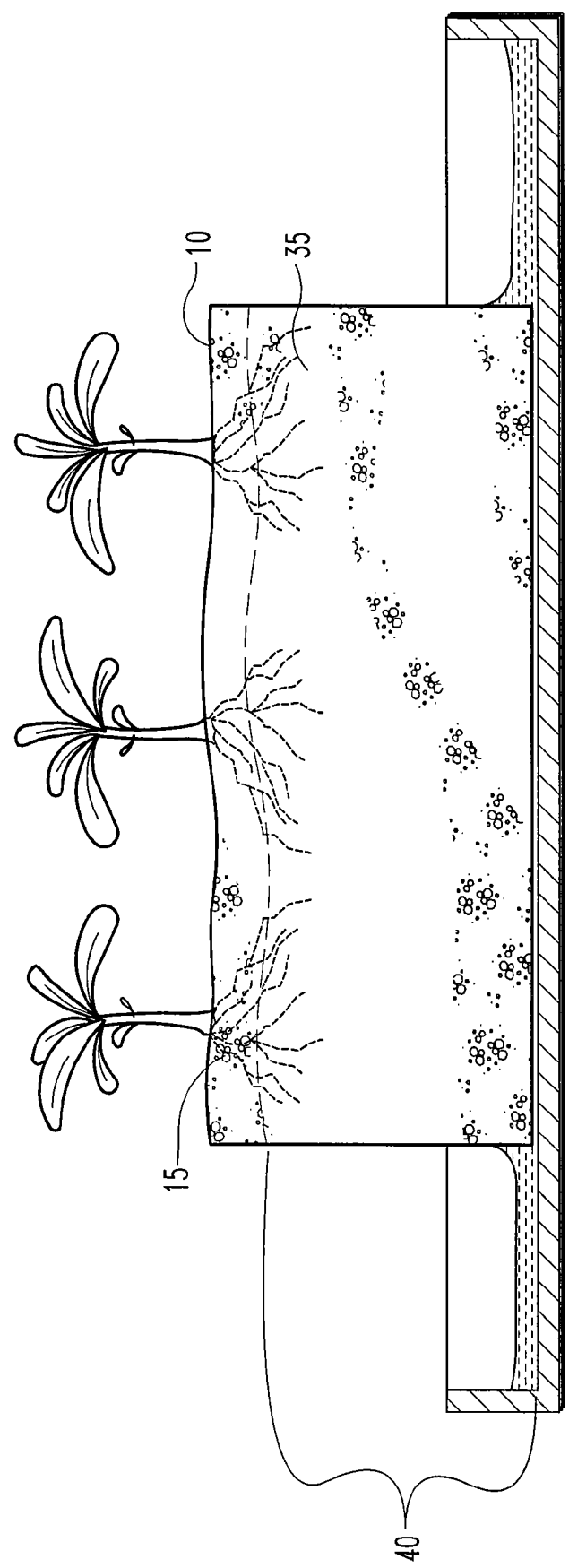
FIG. 3 is a cutaway elevation view of the article of FIG. 2 as partially immersed in water and supporting plant growth.

FIGS. 3 and 5 illustrate other embodiments of the novel technology, hydroponic systems 40, 55 for growing plants. In FIG. 3, a hydroponic system 40 is disclosed wherein a substrate block 10 is partially immersed in a fluid medium 42, such as water or an aqueous nutrient solution. Roots 35 extend downwardly into the top of the substrate block 10 through the interconnected open pores 15. Nutrient solution 42 is carried upwardly into the block 10 via capillary action through the open pores.

FIG. 5 illustrates another embodiment of the present novel technology, a system 55 including foamed glass pebbles or pellets 50 prepared as detailed above and used in a soil-pellet mixture 57 into which plant roots 35 may extend. The pellets 50 contribute by picking up, holding, and slowly releasing water, as well as by providing a network of 'anchors' for the roots 35 to extend into and through.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of making a crushed foamed glass substrate for supporting plant growth, comprising the steps of:
    a) preparing a mixture of powdered glass, foaming agent, hydrophilic agent, and nutrient material;
    b) heating the mixture sufficiently above the dilatometric softening point of the glass so that said mixture foams to form a foamed mixture; and
    c) cooling the foamed mixture to room temperature to form a foamed glass substrate material;
    wherein said heating step comprises first heating said mixture to a temperature of at or below the dilatometric softening point of the glass, maintaining this temperature for a sufficient period of time to allow said mixture to absorb heat evenly, and then increasing the temperature sufficiently above the dilatometric softening point of the glass to a foaming temperature so that said mixture foams to form a foamed mixture.

2. The method of claim 1 and further comprising the step of:
    d) before step b), placing the mixture in a shallow mold.

3. The method of claim 1 wherein step c) is a rapid quench to room temperature.

4. The method of claim 1 wherein the mixture further comprises between about 2 and about 8 weight percent foaming agent, about 0.1 weight percent hydrophilic agent, and between about 0.1 and about 2 percent nutrient material with the balance being powdered glass.

5. The method of claim 1 wherein the foaming agent is limestone, magnesite, or a mixture of the two and wherein the hydrophilic agent is ZnO, SrO, BaO, or a mixture thereof.

6. The method of claim 1 wherein the powdered glass is soda-lime-silica glass; wherein the dilatometric softening point of the glass is between about 1250 and about 1450 degrees Fahrenheit; and wherein the foaming temperature is between about 1275 and about 1700 degrees Fahrenheit.

7. The method of claim 1 wherein the foaming temperature is about 250 degrees Fahrenheit above the dilatometric softening point of the glass.

8. A method of making a foamed glass substrate for supporting plant growth, comprising:
   a) preparing a mixture of glass powder, foaming agent, hydrophilic agent, and plant growth nutrient material;
   b) heating the mixture to a first temperature of approaching the dilatometric softening point of the glass powder;
   c) soaking the mixture substantially at the first temperature for a sufficient time for the mixture to achieve a substantially uniform temperature;
   d) heating the mixture to a second temperature to foam the mixture; and
   e) cooling the foamed mixture to room temperature to form a solid hydrophilic foamed glass substrate material;
   wherein the first temperature is at or below the dilatometric softening point of the glass powder;
   wherein the second temperature is above the dilatometric softening point of the glass powder;
   wherein the solid hydrophilic foamed glass substrate material is characterized as having a plurality of interconnected pores distributed therethrough;
   wherein the solid hydrophilic foamed glass substrate material is characterized by a porosity of at least about 60 percent;
   wherein the pore size is substantially between about 0.5 and about 5 millimeters; and
   wherein the solid hydrophilic foamed glass substrate material is sufficiently chemically stable such that water filling the plurality of interconnected pores experiences a pH shift of less than 0.5.

9. The method of claim 8 and further comprising:
   f) at least partially filling the plurality of interconnected pores with water; and
   g) at least partially infiltrating the plurality of interconnected pores with roots.

10. The method of claim 8 wherein the solid hydrophilic foamed glass substrate material is characterized by a porosity of at least about 80 percent.

11. The method of claim 8 wherein the solid hydrophilic foamed glass substrate material is characterized by a porosity of at least about 90 percent.

12. The method of claim 8 wherein the solid hydrophilic foamed glass substrate material can hold between about 1.5 and about 5 times its own weight in water in the plurality of interconnected pores.

13. The method of claim 8 wherein the solid hydrophilic foamed glass substrate material retains at least about 80 percent of absorbed water for at least about 1 hour in an environment of substantially dry air at a temperature of about 25 degrees Celsius.

14. The method of claim 8 wherein the solid hydrophilic foamed glass substrate material has a density of between about 0.15 and 0.4 grams per cubic centimeter.

15. The method of claim 8 wherein the solid hydrophilic foamed glass substrate material has a density of between about 0.03 and 0.15 grams per cubic centimeter.

16. The method of claim 8 wherein the substrate further comprises between about 2 and about 8 weight percent foaming agent and between about 0.1 and about 2 percent nutrient material with the balance being glass powder.

\* \* \* \* \*